United States Patent Office 3,466,305
Patented Sept. 9, 1969

3,466,305
HALOGEN CONTAINING ETHER EPOXIDES
Pauls Davis, Gibraltar, and Herwart C. Vogt, Grosse Ile, Mich., assignors to Wyandotte Chemicals Corporation, Wyandotte, Mich., a corporation of Michigan
No Drawing. Continuation-in-part of application Ser. No. 560,842, June 27, 1966. This application Nov. 25, 1968, Ser. No. 778,851
Int. Cl. C07d 1/00, 1/18
U.S. Cl. 260—348                     4 Claims

ABSTRACT OF THE DISCLOSURE

A halogen-containing ether composition of matter having a structure depicted by the following formula:

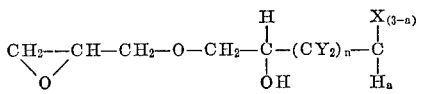

wherein $n$ is an integer of from 0 to 1, $a$ is an integer of from 0 to 1, Y is H or halogen and X is halogen useful in the preparation of more complex epoxide-based compositions of relatively high order of nonflammability.

---

This application is a continuation-in-part of copending U.S. patent application Ser. No. 560,842, filed June 27, 1966 and now abandoned.

This invention relates to useful halogenous compositions and, more particularly, to a new and novel class of halogen-containing ether epoxides which are particularly useful in the preparation of more complex epoxide-based compositions wihch have a relatively high order of nonflammability and which, in many cases, are self-extinguishing.

As used herein, the term "epoxide" denotes a compound characterized by the presence of at least one cyclic ether group, namely, one wherein an ether oxygen atom is attached to two adjacent carbon atoms thereby forming a cyclic structure. The terms "epoxy" and "oxirane ring" also describe the foregoing cyclic ether group.

The commercial potentialities of epoxy-containing resins and related polymeric materials are well recognized by those skilled in the art. The properties of such compositions have made them successful competitors in many applications with other more conventional materials. However, in spite of the excellent physical and chemical properties of such epoxide-based compositions, it has also been found that they possess a major disadvantage and, consequently, a factor which limits the area of their potential use: they are flammable and burn readily.

Accordingly, it is a purpose of this invention to provide a new and useful class of epoxy-containing materials which are thermally stable and may be prepared from commercially available materials which are relatively inexpensive and which are useful as intermediates in the preparation of polymeric compositions which have a high order of nonflammability and which, in many cases, are nonburning.

It has now been found that the foregoing and additional purposes are accomplished by reacting, generally in the presence of a catalyst,
(1) a compound selected from the group consisting of
  (a) glycerol monohalohydrin and
  (b) epihalohydrin and
(2) a compound selected from the group consisting of
  (a) halogenated epoxide containing from 3 to 4 carbon atoms and having attached to a carbon atom of the oxirane ring an alkyl group having up to 2 carbon atoms and containing at least 2, and preferably 3, halogen atoms attached to a terminal carbon atom and where the alkyl group contains 2 carbon atoms and the second carbon atom may also contain a halogen substituent and
  (b) halogenated diol containing from 3 to 4 carbon atoms having one hydroxyl group attached to one terminal carbon atom with the second hydroxyl group attached to the carbon atom adjacent to said terminal carbon atom and having attached to said adjacent carbon atom an alkyl group having up to 2 carbon atoms and containing at least 2, and preferably 3, halogen atoms attached to the remaining terminal carbon atom and where the alkyl group contains 2 carbon atoms the second carbon atom may also contain halogen substituents.

It is essential to the method of this invention that one of the reactants (1) and (2) is an epoxide while the other is a diol. Thus, where reactant (1) is glycerol monohalohydrin reactant (2) is the halogenated epoxide and where reactant (1) is the epihalohydrin reactant (2) is the halogenated diol. These reactions may, in general, be depicted by the following equation:

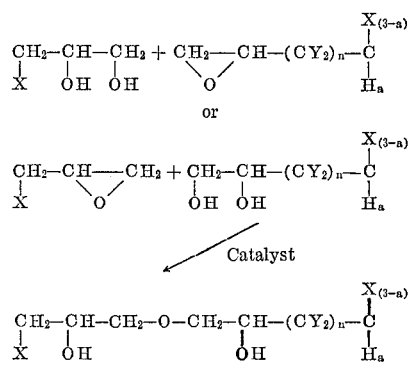

wherein X is a halogen, Y is H or halogen $n$ is an integer from 0 to 1, and $a$ is an integer from 0 to 1. Catalysts which may be used in this reaction are typically those of the Friedel-Crafts type, including anhydrous $AlCl_3$, $BF_3$, $ZnCl_2$, $FeCl_3$, $SnCl_4$, and complexes such as the well-known $BF_3$ etherates, etc.; acid-type catalysts, including HF, $H_2SO_4$, $H_3PO_4$, etc.; and others such as $SbCl_5$.

Since boron trifluoride is a gas at the normal reaction temperatures employed, it is desirable to add the boron trifluoride in the form of a compound or complex of boron trifluoride which is liquid at the reaction temperature. Accordingly, the term "boron trifluoride" as used herein includes boron trifluoride and compounds and complexes of boron trifluoride which facilitate the use of boron trifluoride in the reaction. Either compounds and complexes of boron trifluoride are preferred. These materials are disclosed and discussed in Boron Trifluoride and Its Derivatives by Harold Simmons Booth and Donald Ray Martin, pages 68–71, John Wiley and Sons, Inc., New York, 1949. In general, compounds and complexes of the lower ethers are preferred since these provide higher percentages of $BF_3$ in the compound or complex. Particularly preferred are the boron trifluoride compounds or complexes of dimethyl ether, diethyl ether, methyl ethyl ether and tetrahydrofuran. A suitable product which is readily available is the well-known commercial product known as boron trifluoride etherate which is primarily the boron trifluoride complex of diethyl ether.

In general, a solvent is desirable and sometimes essential in performing this reaction. Organic solvents or diluents which may be used and which are substantially unreactive in this treatment include hydrocarbons such as benzene, toluene, etc.; ketones such as acetone, methyl ethyl ketone, etc.; ethers typified by diethyl ether, dichloroethyl ether, and dioxane; halides such as ethylene dichloride, carbon tetrachloride, etc.

In the above reactions it is possible to vary the proportions of the reactant (1) and reactant (2) over a considerable range. In general, it is preferred to employ equimolar amounts of reactant (1) and reactant (2). However, this proportion can be varied between the molar proportions of reactant (1) to reactant (2) of from about 5:1 to 1:5.

Only small amounts of the more active catalysts such as stannic chloride and boron trifluoride are needed to effect a substantially complete reaction in a short time. Satisfactory results are ordinarily obtained with catalyst concentrations of from a few tenths of 1 percent to 1 percent or more based on the total weight of the reactants, depending on the particular catalyst and reactants. If desired, more or less than this amount may be used even up to a relatively uneconomic 5 percent by weight of the reactants. Thus, the catalyst can be employed in a range from about 0.05 percent to 5 percent by weight but preferably from 0.1 percent to 1 percent by weight of the total reaction mixture.

Halongenated epoxides having 3 to 4 carbon atoms and at least 2 halogen atoms which may be employed as reactant (2) include 3,3,3-trichloropropylene oxide, 3,3,3-tribromopropylene oxide, 4,4,4-trichlorobutylene-1 oxide, 4,4,4-tribromobutylene-1 oxide, 3,3-dichloropropylene oxide, 4,4-dichlorobutylene-1 oxide, 4,4-dibromobutylene-1 oxide and 3,3-dibromopropylene oxide and oxides of mixed halides such as 3-bromo-3,3-dichloropropylene and 4-bromo-4,4-dichlorobutylene-1 oxides.

Halogenated diols which may be employed as reactant (2) include 3,3,3-trichloro-1,2-dihydroxypropane, 3,3,3-tribromo - 1,2 - dihydroxypropane, 4,4,4 - trichloro - 1,2-dihydroxybutane, 4,4,4 - tribromo-1,2-dihydroxybutane, 3,3-dichloro-1,2-dihydroxypropane, 3,3-dibromo-1,2-dihydroxypropane, 4,4-dichloro-1,2-dihydroxybutane, 4,4-dibromo-1,2-dihydroxybutane, and diols of mixed halides such as 3-bromo-3,3-dichloro-1,2-dihydroxypropane.

The reaction of reactant (1) with reactant (2) proceeds smoothly at a temperature of from about 50° C. to 150° C. and the time required generally ranges from about 15 minutes to 6 hours.

An epoxide compound may be formed from the product of the above reaction by reacting it with an alkaline material to accomplish ring closure and thus produce an epoxy group whereby a halogenated glycol glycidyl ether is prepared.

This epoxidation may, in general, be depicted by the following equation:

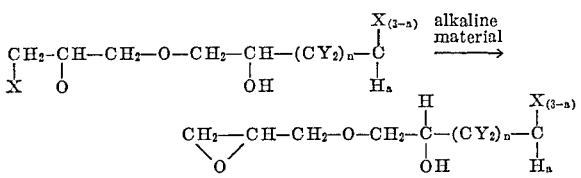

wherein $n$, $a$, Y, and X are the same as in the equation illustrating the first reaction. The quantity of the alkaline material used for the final step, i.e., epoxidation, may be varied widely. Satisfactory results are ordinarily obtained with sufficient alkaline material to provide a reaction mixture having a pH from about 10 to 14. The ring closure step in the presence of alkaline material is preferably carried out at a temperature of about 5° C. to 60° C. and generally requires a period of from 15 minutes to 2 hours for completion. Numerous alkaline materials are known for ring closure to produce epoxides and all such materials and procedures for using same are contemplated herein. For example, aqueous and anhydrous sodium or potassium or lithium hydroxide may be used. A large number of basic reacting metal salts of strong bases and weak acids are also known for this purpose. Illustrative of such alkaline materials are sodium and potassium carbonates and bicarbonates, borax, hydroxides of magnesium, etc.

As stated above, the product as produced in accordance with the present invention may be beneficially used in the preparation of more complex epoxide-based compositions useful for a variety of purposes, including most applications where commercial epoxide-based compositions are currently being used, but giving products with superior fire resistance. They range from liquids to rubbery elastomers to hard, strong plastics. These products can be used for variety of purposes in such diversified fields as adhesives, coatings, molded and pressed articles as well as in potting and encapsulation and the like. They can be polymerized and cross-linked with various well-known cross-linking agents such as polyamines or acid anhydrides to yield materials useful in a wide variety of applications including flexible and rigid coatings and soft-to-hard plastics from which useful articles may be made by molding, pressing, etc., all having a high degree of noninflammability and, in many cases, even being non-burning. Additional uses and modifications of the stated uses will be readily apparent to one skilled in the art.

The practice of this invention will be more completely understood by reference to the following examples.

Example I

In a five-liter, round-bottom flask equipped with a condenser and stirrer, 442 grams (4.0 moles) glycerol monochlorohydrin (3-chloropropane 1,2-diol) and 645 grams (4.0 moles) 3,3,3-trichloropropylene oxide are mixed in 500 milliliters of chloroform and approximately two liters of BF₃ gas bubbled into the solution. The reaction begins at once causing the chloroform to reflux vigorously and the material is cooled by running ice water over the outside of the flask. The reaction requires approximately 15 minutes after which the solvent is vacuum stripped. This product is then dissolved in 500 milliliters of benzene employing the same equipment as for the above reaction and 176 grams (4.4 moles) of sodium hydroxide in 700 milliliters of water added. Cooling by running ice water over the outside of the flask is required to maintain the temperature at 45° C. The reaction mixture is stirred for 15 minutes, followed by separation of two layers. The benzene layer is washed with water and the organic layer is dried with magnesium sulfate, filtered, and stripped. A yield of 796 grams (84.5%) is obtained. The product has an epoxy oxygen content of 6.08 weight percent and a chlorine content of 44.9 weight percent by analysis. The molecular weight is 235 by the ebulliometric technique.

Example II

In a two-liter, round-bottom flask equipped with a condenser and stirrer, 221 grams (2 moles) glycerol monochlorohydrin (3-chloropropane-1,2-diol) and 351 grams (2 moles) 4,4,4-trichlorobutylene-1 oxide are mixed in 500 milliliters of chloroform and approximately 3 grams BF₃ gas catalyst added. The reaction begins at once causing the chloroform to reflux vigorously and the material is cooled by running ice water over the outside of the flask. The reaction requires approximately 30 minutes after which the solvent is vacuum stripped. This product is then dissolved in 500 milliliters of benzene employing the same equipment as for the above reaction and 123 grams (2.2 moles) of potassium hydroxide in 350 milliliters of water added. Cooling by running ice water over the outside of the flask is required to maintain the temperature at 45° C. The reaction mixture is stirred for 30 minutes, followed by separation of two layers. The benzene layer is washed with water and the organic layer is dried with magnesium sulfate, filtered, and stripped. The product is a yellowish colored liquid which has an epoxy oxygen content of 5 percent and a chlorine content of 42 weight percent. The molecular weight is 250.

Example III

In a two-liter, round-bottom flask equipped with a condenser and stirrer, 110.5 grams (1 mole) glycerol monochlorohydrin (3-chloropropane-1,2-diol) and 206 grams (1 mole) 3-bromo-3,3-dichloropropylene oxide are mixed in 500 milliliters of chloroform and approximately 0.5 liter $BF_3$ gas bubbled into the solution. The reaction begins at once causing the chloroform to reflux vigorously and the material is cooled by running ice water over the outside of the flask. The reaction requires approximately 30 minutes after which the solvent is vacuum stripped. This product is then dissolved in 250 milliliters of benzene employing the same equipment as for the above reaction and 44 grams (1.1 moles) of calcium oxide in 500 milliliters of water added. Cooling by running ice water over the outside of the flask is required to maintain the temperature at 45° C. The reaction mixture is stirred for 60 minutes, followed by separation of two layers. The benzene layer is washed with water and the organic layer is dried with magnesium sulfate, filtered, and stripped. The product is a yellow colored liquid which has an epoxy oxygen content of 5.8 weight percent, a bromine content of 30 weight percent, and a chlorine content of 19 weight percent. The molecular weight is 264. The product has a boiling point of 172° C. to 185° C. at 0.5 millimeter of mercury.

Example IV

In a twelve-liter, round-bottom flask equipped with a condenser and stirrer, 2210 grams (20 moles) glycerol monochlorohydrin (3-chloropropane-1,2-diol) and 2540 grams (20 moles) 3,3-dichloropropylene oxide and approximately 8 grams of tin tetrachloride catalyst are reacted in cumulative batches. The reaction is controlled by adding increments of approximately 250–300 milliliters of a mixture of the chlorohydrin and 3,3-dichloropropylene oxide. This product is then dissolved in 5000 milliliters of benzene employing the same equipment as for the above reaction and 1885 grams (11 moles) of barium hydroxide in 10,000 milliliters of water added. Cooling by running ice water over the outside of the flask is required to maintain the temperature at 45° C. The reaction mixture is stirred for 120 minutes, followed by separation of two layers. The benzene layer is washed with water and the organic layer is dried with magnesium sulfate, filtered, and stripped. The product is a colorless liquid which has an epoxy oxygen content of 8.5 percent and a chlorine content of 38.4 weight percent. The molecular weight is 185.

Example V

In a test tube, 11 grams (0.1 mole) glycerol monochlorohydrin (3-chloropropane-1,2-diol) and 11 grams (0.1 mole) 3,3,3-trifluoropropylene oxide are mixed in 10 milliliters of chloroform and approximately 100 milliliters $BF_3$ gas catalyst added. The reaction begins at once causing the chloroform to reflux vigorously and the material is cooled by running ice water over the outside of the test ube. The reaction requires approximately 30 minutes after which the solvent is vacuum stripped. This product is then dissolved in 25 milliliters of benzene employing the same equipment as for the above reaction and 4.4 grams (1.1 moles) of sodium hydroxide in 10 milliliters of water added. Cooling by running ice water over the outside of the tube is required to maintain the temperature of 45° C. The reaction mixture is stirred for 15 minutes, followed by separation of two layers. The benzene layer is washed with water and the organic layer is dried with magnesium sulfate, filtered, and stripped. The product is a colorless liquid which has an epoxy oxygen content of 8.5 percent and a fluorine content of 30 weight percent. The molecular weight is 187. The product has a boiling point of 172° C. to 185° C. at 0.5 millimeter of mercury.

Example VI

In a 500-milliliter, round-bottom flask equipped with a condenser and stirrer, 155 grams (1 mole) glycerol bromohydrin (3-bromopropane-1,2-diol) and 162 grams (1 mole) 3,3,3-trichloropropylene oxide are mixed in 250 milliliters of chloroform and approximately 1 gram $BF_3$ catalyst added. The reaction begins at once causing the chloroform to reflux vigorously and the material is cooled by running ice water over the outside of the flask. The reaction requires approximately 25 minutes after which the solvent is vacuum stripped. This product is then dissolved in 500 milliliters of benzene employing the same equipment as for the above reaction and 44 grams (1.1 moles) of sodium hydroxide in 200 milliliters of water added. Cooling by running ice water over the outside of the flask is required to maintain the temperature at 45° C. The reaction mixture is stirred for 20 minutes, followed by separation of two layers. The benzene layer is washed with water and the organic layer is dried with magnesium sulfate, filtered, and stripped. The product is a colorless liquid which has an epoxy oxygen content of 6.1 percent and a chlorine content of 45 weight percent. The molecular weight is 235.

Example VII

In a five-liter, round-bottom flask equipped with a condenser, stirrer, thermometer, and dropping funnel, 358 grams (2.0 moles) of 3,3,3-trichloropropylene glycol are dissolved by heating in one liter of chloroform and 135.6 grams (2.0 moles) boron trifluoride gas bubbled into the solution. 185 grams (2.0 moles) of epichlorohydrin are then added dropwise to the mixture causing some refluxing of the solvent. At the completion of the addition, the solution is stirred for 15 minutes and then washed with sodium bicarbonate solution and water. The average reaction temperature is 70° C. The organic layer of the resulting product is separated, dried with magnesium sulfate and stripped to yield 813 grams (94%) of a thin, yellow oil which distills at 185° C. at 1.5 millimeters of mercury. A hydroxyl content of 12.4 weight percent and a chlorine content of 51.6 weight percent by analysis are obtained along with a molecular weight by the ebulliometric technique of 309.

Additional product is prepared as described above and 913 grams (3.36 moles) of this product are mixed with 2 liters of toluene using the same equipment as above and cooled to +10° C. 222 grams (3.36 moles) 85% pure potassium hydroxide in 222 grams of water are added incrementally with cooling by passing water over the outside of the flask. At completion of the addition, the mixture is allowed to warm to room temperature and stirred for 1½ hours. One liter of water is then added and neutralized with HCl. The toluene layer is washed with water, dried over magnesium sulfate, decolorized with charcoal, filtered through a Celite bed, and stripped. The over-all yield is 810 grams (89%). This epoxide product is distilled at 165° C. to 175° C. The product is a colorless liquid which contains 47.3 weight percent chlorine, 8.5 weight percent hydroxyl groups by analysis, has a molecular weight, determined by the ebulliometric technique, of 285, and is soluble in polar as well as non-polar solvents.

Example VIII

In a five-liter, round-bottom flask equipped with a condenser, stirrer, thermometer, and dropping funnel, 179 grams (1 mole) of 3,3,3-trichloropropylene glycol are dissolved by heating in one liter of chloroform and 68 grams (1 mole) $BF_3$ catalyst. 137 grams (1 mole) of epibromohydrin are then added dropwise to the mixture causing some refluxing of the solvent. At the completion of the addition, the solution is stirred for 30 minutes and then washed with sodium bicarbonate solution and water. The average reaction temperature is 70° C. The organic layer of the resulting product is separated, dried with magnesium sulfate and stripped to yield 300 grams (95%) of a thin, yellow oil. A hydroxyl content of 10.8 weight percent and a chlorine content of 33 weight percent and a bromine content of 25 weight percent are obtained along with a molecular weight of 316.

This product is then mixed with 500 liters of toluene using the same equipment as above and cooled to +8° C. 44 grams (1.1 moles) sodium hydroxide in 200 grams of water are added incrementally with cooling by passing water over the outside of the flask. At completion of the addition, the mixture is allowed to warm to room temperature and stirred for one hour. One liter of water is then added and neutralized with HCl. The toluene layer is washed with water, dried over magnesium sulfate, decolorized with charcoal, filtered through a Celite bed, and stripped. The product is a colorless liquid which contains 45 weight percent chlorine, 7.2 weight percent hydroxyl groups, has a molecular weight of 235, and is soluble in polar as well as non-polar solvents.

The following examples illustrate the preparation of cured plastics from the product of the instant invention. Conventional products may be prepared from these plastics such as epoxy casting resins for models, patterns, molds, tools, insulation, encapsulation and potting. Coatings with epoxy resins is also an important field of application. Conventional techniques such as compression molding, hand lay-up, casting and high-pressure laminating may be employed in the preparation of these and other useful products.

Example IX 24 grams (0.1 mole) of the product prepared in Example I above were reacted with 8.7 grams (0.05 mole) toluene diisocyanate (80/20 mixture of 2/4 and 2/6 isomers) in the presence of 0.2 gram stannous octoate catalyst in a 100-milliliter, three-neck flask equipped with a stirrer and thermometer. The homogeneous mixture was heated to 80° C. for 3 hours and then allowed to stand overnight. The viscous straw-colored product had an observed molecular weight of 729 by ebulliometric technique, and contained 35.2% by weight chlorine, and 4.8% by weight oxirane oxygen (an epoxy equivalent of 330) by analysis.

To 25 grams of the above diepoxide in a 100-milliliter beaker, 8 grams of a polyamide with an amine value of 300 and an equivalent weight of 183 was added. A homogeneous clear mixture was obtained which was poured into a mold and allowed to cure for one week at room temperature. The cured plastic product had a Barcol hardness of 65 and a heat distortion temperature of 135° F. by the ASTM D–648 method. The product was tested according to the ASTM D–635 method and found to be nonburning.

Example X 48 grams (0.02 mole) of the product prepared in Example VII above were reacted with 17.4 grams (0.1 mole) toluene diisocyanate (80/20 mixture of 2/4 and 2/6 isomers) in the presence of 0.1 gram of stannous octoate catalyst in a 100-milliliter, three-neck, round-bottom flask equipped with a stirrer and thermometer. The homogeneous mixture was warmed to 80° C. for 3 hours and then allowed to stand overnight at room temperature. A viscous straw-colored product was produced which had an observed molecular weight of 789 by ebulliometric technique and contained 33.1% chlorine, and 44.7% oxirane oxygen (an epoxy equivalent of 340) by analysis.

16 grams of a polyamide having an equivalent weight of 183 and an amine value of 300 was added to 50 grams of the above prepared diepoxide in a 100-milliliter beaker and mixed until a homogeneous mixture was obtained. This product was poured into a mold and allowed to cure for 7 days at room temperature. The product had a Barcol hardness of 65 and a heat distortion temperature of 135° F. as determined by the ASTM D–648 method. The cured resin was nonburning as measured by the ASTM D–635 method.

The products produced as described in Examples II through VI and VIII may also be reacted in the manner described in Examples IX and X to produce useful plastic products having properties similar to the products of Examples IX and X.

It is to be understood that various changes and modifications may be made in the foregoing composition and process without departing from the spirit of the invention and scope of the appended claims.

What is claimed is:
1. A halogen-containing ether composition of matter having a structure depicted by the following formula:

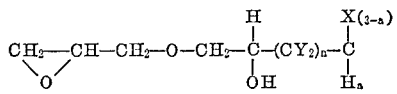

wherein $n$ is an integer of from 0 to 1, $a$ is an integer of from 0 to 1, Y is H or halogen and X is halogen.

2. Composition as defined in claim 1 in which X is chlorine and Y is hydrogen.

3. Composition as defined in claim 1 in which $n$ is 0.

4. Composition as defined in claim 1 in which $n$ is 1.

References Cited

UNITED STATES PATENTS

| | | |
|---|---|---|
| 2,951,854 | 9/1960 | Chiddix et al. |
| 2,989,547 | 6/1961 | Whyte. |
| 3,033,816 | 5/1962 | Price et al. |
| 3,129,232 | 4/1964 | Terford et al. |

NORMA S. MILESTONE, Primary Examiner

U.S. Cl. X.R.

260—2, 348.6